A. H. WHATLEY.
MICROMETRIC GAGE.
APPLICATION FILED APR. 5, 1919.

1,317,747.

Patented Oct. 7, 1919.

Inventor.
Alfred H. Whatley
By Horatio E. Bellows
Attorney.

UNITED STATES PATENT OFFICE.

ALFRED H. WHATLEY, OF PROVIDENCE, RHODE ISLAND.

MICROMETRIC GAGE.

1,317,747.         Specification of Letters Patent.         Patented Oct. 7, 1919.

Application filed April 5, 1919. Serial No. 287,870.

*To all whom it may concern:*

Be it known that I, ALFRED H. WHATLEY, a citizen of the United States, residing at Providence, in the county of Providence and State of Rhode Island, have invented certain new and useful Improvements in Micrometric Gages, of which the following is a specification.

My invention relates to micrometric gages adapted for general measurements including depth.

The essential objects of my invention are the attainment of accurate and micrometric measurements with facility and speed, and to avoid the inaccuracies involved in the use of measuring rods having engagement with the remainder of the device by engagement with annular grooves.

The invention consists, therefore, in the means and mechanism for producing the results above specified substantially as hereinafter claimed.

Figure 1:
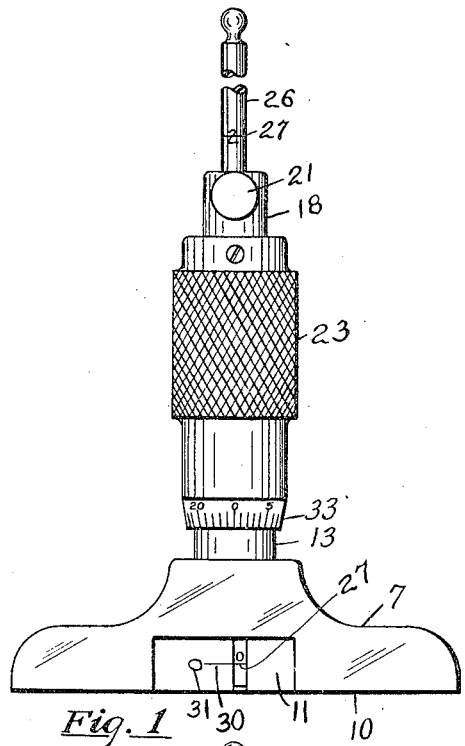
Figure 2:
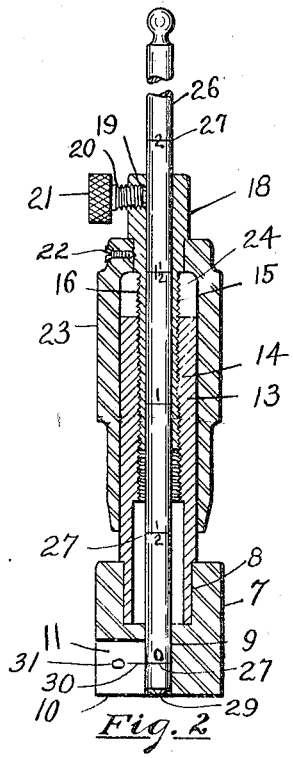
Figure 4:
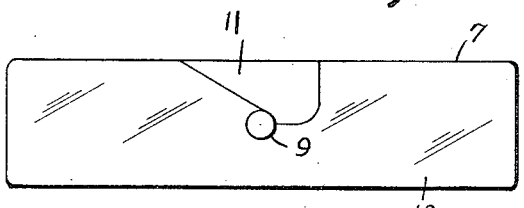
Figure 3:
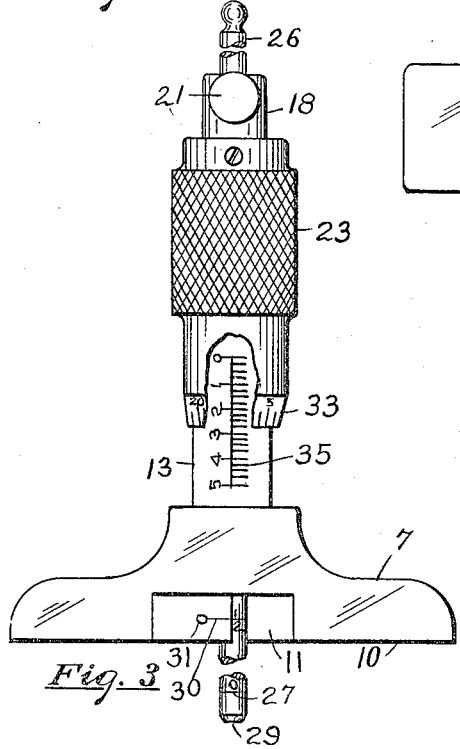

In the drawings herewith illustrating the principle of this invention and the best mode now known to me of applying that principle, Figure 1 is a front elevation of my device, Fig. 2, a vertical central section of the same, Fig. 3, an elevation similar to that shown in Fig. 1, with a portion broken away, and Fig. 4, a bottom plan view of the device.

Similar characters of reference indicate similar parts throughout the views.

In the construction illustrated 7 is an oblong base provided with a central circular cavity 8 in its upper portion, from which extends a vertical opening 9 extending to a measuring face 10 constituting the surface of the base. There is a lateral cavity 11 in the base extending to the opening 9. Frictionally engaging the base in the cavity 8 is a barrel 13 provided with an internal measuring thread 14 engaging a like external thread 15 upon a tube 16 having an enlarged upper portion 18 provided with a threaded opening 19 in which is a binding screw 20 provided with a milled head 21. Fast to the tube portion 18 by a screw 22 or otherwise, or integral therewith is a measuring thimble 23 slidable upon the exterior of the barrel 13 and forming an annular chamber 24 for the latter. Slidably mounted in the tube 13 and in the opening 9 is a grooveless measuring rod 26 divided by annular lines 27 into equal sections, in this instance one-half inch apart, marked consecutively 0, $\frac{1}{2}$, 1, $1\frac{1}{2}$, 2, etc. The graduation 27 indicated at 0 is slightly spaced from the measuring end 29 of the rod. In the wall of the base 7 within the cavity 11 is a horizontal line or graduation 30, also indicated by a zero character 31.

The thimble 23 has a beveled lower portion provided with the usual annular micrometric scale 33 moving over the usual complementary vertical micrometric scale 35 on the barrel 13.

The operation of my gage is as follows: With the parts as shown in Fig. 2 the screw 20 is loosened from the rod 26 and the surface 10 of the base placed upon or against the margin of work to be measured, and the rod manually advanced toward the base until its end 29 contacts with the surface to which measurement is to be taken. Then the screw 20 is tightened, clamping the rod to move with the thimble 23. The thimble meanwhile has been placed so that its 0 graduation of scale 33 registers with the 5 or lowest graduation of the barrel scale 35. After the above arrangement the thimble is manually rotated backwardly until the nearest graduation 27 on the rod registers with the graduation 30. The reading is then taken from the rod and thimble. The distance between each graduation 27 equals the length of the scale 35, and the distance from the 0 graduation to the face 29 equals the distance from line 30 to the surface 10.

If it is desired to set the rod projecting any desired or predetermined distance, the thimble is set with the 0 graduation of its scale 33 at the 0 graduation of the scale 35. The rod 26 is next loosened by the screw 20 and manually advanced toward the base until the desired graduation 27 of the rod registers with the line 30. Then the screw 20 is tightened engaging the rod with the thimble, and the latter is screwed downwardly until the desired amount is registered upon the scales 33 and 35. The rod is now projected the desired amount.

It will be noted that in this construction the rod may be of any desired length, which is a great practical advantage.

I claim:—

1. In a micrometric gage of the character described, the combination with the base, of a barrel fast to the base, provided with a measuring thread, a tube provided with a thread, engaging the first thread, a measuring thimble fast to the tube, a measuring rod slidably mounted in the tube and base provided with graduations, and a clamping screw in the sleeve engaging the rod.

2. In a micrometric gage of the character described, the combination of a base provided with a graduation line, a barrel fast to the base provided with an external scale and an internal thread, a tube provided with a thread engaging the first thread, a measuring thimble on the tube provided with a scale registering with the first scale, a grooveless measuring rod slidably mounted in the tube and base provided with graduations adapted to coöperate with the graduation line.

3. In a micrometric gage of the character described, the combination of a base provided with a central vertical bore, a measuring face on its under side, and a lateral visual cavity extending to the bore, said base being provided within the cavity with a graduation line extending to the bore, a barrel rigid with the base provided with an external scale and an internal thread, a tube in the barrel provided with a measuring thread engaging the first thread, a thimble on the tube provided with an annular scale coöperating with the first scale, a grooveless measuring rod slidably mounted in the tube and in the bore of the base provided with graduations adapted to register with the graduation line.

In testimony whereof I have affixed my signature.

ALFRED H. WHATLEY.

Copies of this patent may be obtained for five cents each, by addressing the "Commissioner of Patents. Washington, D. C."